3,520,784
METHOD OF PREPARING A COUPLED-FILM DEVICE

Gene S. Alberts, Essex Junction, Vt., and James M. Brownlow, Crompond, and Kurt R. Grebe, Beacon, N.Y., assignors to International Business Machines Corporation, Armonk, N.Y., a corporation of New York No Drawing. Filed June 17, 1968, Ser. No. 737,350
Int. Cl. C23f 17/00; B23p 3/00
U.S. Cl. 204—38 4 Claims

ABSTRACT OF THE DISCLOSURE

An electrolytic plating bath for depositing smoothing copper films is disclosed. The bath contains water, a water soluble copper salt, a source of sulfate ions, a source of nitrate ions, tartaric acid, gelatin and a surfactant. A critical limitation of the bath is that the ratio of nitrate ions to sulfate ions is maintained in a range from about 0.30 to about 10.0.

BACKGROUND OF THE INVENTION

Magnetic thin film devices commonly known as coupled film devices, are increasingly gaining in importance in computer memory applications. Coupled film devices are so called because tiers of thin magnetic films are arranged so that the field of one film is coupled with that of another either through air by means of filtering magneto-static fields or through common magnetic material. These devices are generally prepared by depositing a thin magnetic film, generally permalloy on insulated ground planes having a smoothing copper film thereon followed by the deposition of a thick copper film on the first magnetic film, a smoothing copper film and subsequently depositing a second permalloy or magnetic film on the above copper films. By smoothing copper films it is meant that the copper films are relatively flat, free of sharp hills or depressions, and are made up of very small copper grains.

In the past it was desired to have magnetic films with low values of dispersion ($\alpha$) e.g., 1° or less and coercivity ($H_0$) values of about 2. With the advancement of the technology of making coupled film devices, it has been discovered that it is more desirous to increase the value of $H_0$ to about 4, while at the same time maintaining $\alpha$ at 1° or less. This new requirement allows the coupled film devices to have better pulse performance than formerly obtained. Thus, as the technology of preparing these devices advances, more attention is paid to the control of their magnetic properties in order to make these devices suitable for commercial use.

It has been discovered that the above magnetic parameters are influenced by the method of the plating of magnetic films, for example, see co-pending application Ser. No. 573,417 to J. M. Brownlow, filed Aug. 16, 1966 and Ser. No. 601,951 to J. M. Brownlow and Harald Dahms, filed Dec. 15, 1966 both applications being commonly assigned to the IBM Corporation. In addition to the method of depositing magnetic films, it has also been found that the conducting surface, upon which the magnetic film is deposited, also plays an important role in determining the magnetic properties of the deposited magnetic films. For example, it has been found that the orientation or dispersion ($\alpha$), is closely dependent upon the texture and grain size of the conducting film as the coercivity of the magnetic films is likewise affected. Thus, in order to have optimum magnetic properties in a magnetic thin film device it is necessary to deposit a thick copper conducting layer in order to enhance its current carrying ability, additionally the copper layer should have a smooth texture and very small grain size so as to provide a subsequently deposited magnetic film with a value of $\alpha$ of 1 or less, an $H_0$ value of 4 or more and should have a low internal stress so that on heating the magnetic film the copper film does not change dimensions which change has a consequence of producing high stresses which destroy the orientation and raise the coercivity of the magnetic film. An electrolytic bath for depositing thick highly conductive copper films and a method of depositing the same is the subject of co-pending patent application entitled "An Improved Copper Plating Bath and a Method of Depositing Thick Copper Films Therefrom" to J.M. Brownlow, filed as IBM docket YO9-67-141, on the same date as this application; assigned to the same assignee as this application. The above mentioned application discloses a plating bath which is compatible with that of the present application and is used in conjunction therewith.

The prior art is replete with methods and baths for the electro-deposition of copper films, for example, several baths are taught in the following patents: Pat. No. 2,738,-318; Pat. No. 3,293,109; Pat. No. 2,762,762; Pat. No. 3,220,897; Pat. No. 2,374,289; to name just a few of the many patents describing electrolytic copper plating baths. However, while the plating baths and methods disclosed in the prior art are suitable for the purpose intended therein, they have been found to be deficient for depositing copper inducting films for the devices of this invention.

BRIEF DESCRIPTION OF THE INVENTION

According to an aspect of the invention, there is provided an electrolytic plating bath for depositing smoothing copper films. The bath is comprised of water, a source of sulfate ions to produce sulfate ions in the range of about 0.060 to about 0.37 mole/liter, a water soluble copper salt to produce copper ions in the range of about .062 to about 0.132 mole/liter, a source of nitrate ions to produce nitrate ions in the range of about .032 to about 0.40 mole/liter, tartaric acid in the range of about 0.007 to about 0.040 mole/liter and gelatin in the range of about 0.10 to about 0.50 gm./liter. Copper films deposited from the above bath produced films having grain size of the order of about 100 A. and exhibit highly smooth textures. The deposited films are also found to exhibit low internal stress, i.e., they do not blister or distort on undergoing a heat cycle at temperatures of about 200° C. Additionally, the films enable the control of the magnetic properties of a magnetic film subsequently deposited thereon. For example, the deposited magnetic film exhibits an increased coercivity while at the same time maintaining a low dispersion. Additionally the magnetic properties do not change on heat cycles to 200° C.

According to another aspect of the invention there is provided a method of making coupled film devices. The method comprises the steps of:

(a) coating a metal ground plane with an insulating layer,
(b) evaporating a thin copper film on the insulator,
(c) electroplating a first smoothing copper film onto the copper film from the bath of this invention,
(d) electrodepositing a first magnetic film onto the smoothing copper layer,
(e) electrodepositing a thick copper film onto said first magnetic film,
(f) electrodepositing a second smoothing copper film onto said thick copper film, and
(g) subsequently electrodepositing a second magnetic film onto said second smoothing copper layer.

OBJECTS OF THE INVENTION

An object of the invention is to provide an electrolytic plating bath for depositing smoothing copper films.

Another object of the invention is to provide a smoothing copper plating bath from which a copper film having grain sizes of the order of 100 A. can be deposited.

And yet another object of the invention is to provide a smoothing copper plating bath from which a copper film can be deposited, said copper film causing an increase in the coercivity of a magnetic film deposited thereon while maintaining a low dispersion value.

And still another object of the invention is to provide a method of preparing a coupled film device using the smoothing copper plating bath of this invention.

The foregoing and other objects, features and advantages of the invention would be apparent from the following more particular description of the preferred embodiment of the invention, as illustrated in the accompanying examples.

DESCRIPTION OF PREFERRED EMBODIMENTS

In the practice of the invention all reagents used are reagent grade. The source of sulfate ions may be a reagent grade metal sulfate salt or sulfuric acid. For example, copper sulfate can be the source of both the sulfate ion as well as for cupric ions. As indicated above, copper sulfate may be the water soluble copper salt that is used for providing copper ion in solution. Other water soluble copper salts may also be used, such as copper nitrate which, in addition, provides nitrate ions which are essential to the bath. Similarly, nitric acid may be used as the source for nitrate ions when the copper salt used is copper sulfate. In addition to the above constituents, gelatin and tartaric acid are also essential to the bath. Gelatin and tartaric acid serve to reduce the grain size of the plated film. Tartaric acid has the added function of determining the aging behavior of the plated smoothing copper film. Gelatin is added to the above solution as a pre-cooked 1% solution, with a 1% acetic acid preservative. If an excess amount of gelatin and tartaric acid are included under or in the film, stress damage of subsequent magnetic alloy films will occur.

In preferred embodiments of this invention, sulfate ions, from whatever source, must be maintained in a range of from about 0.060 to about 0.37 mole/liter. The nitrate ions should be present in solution in the range of from about 0.032 to about 0.40 mole/liter and should be maintained in a molar ratio with the sulfate ion in the range of from about 0.30 to about 10.0. Copper ions are to be present in the bath in the range of from about 0.062 to about 0.132 mole/liter. In addition to the above constituents, there is (added as a 1% solution) gelatin in the amounts of about 0.10 to about 0.50 gm./liter. Tartaric acid is added to the bath in the amount of about 0.007 to about 0.04 mole/liter. In addition to the above constituents, there may be added a surfactant such as Triton X 100, (a surfactant prepared by Rohm and Haas Co.), in the amount of about .3 to about .8 gram/liter.

It should be understood that the above ranges given for the constituents of the bath of this invention are deemed to be critical. Experimentation has shown that when the range of the constituents fall without the boundaries of those given, the copper films produced are found to be inadequate for the purposes intended. For example, the subsequently plated magnetic alloyed films exhibit magnetic properties which are unpredictable, that is, the coercivity of the film vary over a large range as does the value of the dispersion. Additionally, the magnetic film exhibit large stress upon heat treatment due to the distortion or blistering of the copper film.

In order that those skilled in the art may better understand how the present invention may be practiced the following examples are given by way of illustration and not by way of limitation.

EXAMPLE I

An electrolytic plating bath for depositing smoothing copper is prepared having the following proportions of constituents:

Water to make 1000.0 cc.
$H_2SO_4$—.270 mole
$Cu(NO_3)_2 \cdot H_2O$—.100 mole
Tartaric acid—.020 mole
Gelatin—0.15 gm.
Triton X 100—0.60 gm.

A copper film is evaporated onto an insulated ground plane. The ground plane may be copper or other highly conductive metals. The insulating material used in this invention is Pyre M-L (a polyamide resin prepared by Rohm and Haas Co.) however, other known suitable insulating materials can be used to advantage. A conductive copper film of about 600 A. thick is then evaporated onto the surface of the insulating layer. The copper is evaporated at a rate of about 10 A./sec. at a pressure of about $5 \times 10^{-5}$ mm. Critical to the evaporation step is that the first 150 A. be deposited at about 125° C. and the next 450 A. is deposited at below 50° C. These conditions are necessary to insure good adhesion of the metal to the insulator and to maintain the grain size of the film at about 50 A.

After having evaporated the copper film onto the insulator surface as above, the substrate is placed in a cell containing the bath described above. The bath is filtered and flowed across the evaporated copper coated surface of the substrate at a uniform velocity to avoid copper spikes. A current density of about 30 to 40 ma./cm.$^2$ is maintained. Plating is continued at room temperature for a time sufficient to obtain the desired thickness of the smoothing copper layer, e.g., 3000 A. A plating rate of 2,000 A. per minute is maintained. The plated copper film is found to have grain sizes of the order of 100 A.

At the completion of the copper plating operations the plated substrate is rinsed in the demineralized water for 10 seconds and in a magnetic alloy rinse bath for 5 seconds. A first magnetic film of about 900 A. thick is then deposited thereon according to the methods and baths disclosed in the commonly assigned copending patent applications Ser. Nos. 573,417 and 601,951 referred to above. In general the methods described in application Ser. Nos. 573,417 and 601,951 are related to pulse plating processes in which selective agitation between pulses is employed. The magnetic film is plated on the smoothing copper film in a dilute bath containing Ni and Fe or Ni, Fe and Cu. The plating current is one at which all these ions plate out on the substrate and the current is controlled to provide a series of current pulses through the bath and each pulse causes a magnetic layer to be plated. Typically, pulses are maintained at a duration of about 10 seconds. After each pulse, i.e., after the current is turned off the solution is agitated vigorously for 4 to 6 seconds. The current starts at about 11 ma./cm.$^2$ and decreases approximately geometrically to about 5.5 ma./cm.$^2$. Typical baths used in the above patent application are as follows:

| | Low | High | Actual |
|---|---|---|---|
| Demineralized $H_2O$ (cc.) | 1,000 | 1,000 | 1,000 |
| Triton X-199 detergent (g.) | 0.2 | 0.6 | 0.6 |
| Saccharin, Na (g.) | 0.5 | 2.0 | 1.0 |
| Sulfamic acid (g.) | 0.5 | 5.0 | 1.0 |
| Sodium potassium tartrate (g.) | 5.0 | 10.0 | 7.5 |
| $NiSO_4$—$6H_2O$ (g.) | 10.0 | 30.0 | 15.0 |
| $FeSO_4$—$7H_2O$ (g.) | 1.0 | 8.0 | 2.25 |
| | | | Preferred |
| Demineralized $H_2O$ (cc.) | 1,000 | 1,000 | 1,000 |
| Triton X-199 detergent (g.) | 0.2 | 0.6 | 0.6 |
| Saccharin, Na (g.) | 0.5 | 2.0 | 1.0 |
| Sulfamic acid (g.) | 0.5 | 5.0 | 1.0 |
| Sodium potassium tartrate (g.) | 5.0 | 10.0 | 7.5 |
| $NiSO_4 \cdot 6H_2O$ (g.) | 10.0 | 30.0 | 15.0 |
| $FeSO_4 \cdot 7H_2O$ (g.) | 1.0 | 8.0 | 1.75 |
| $CuSO_4 \cdot 5H_2O$ (g.) | 0.5 | 3.0 | 1.75 |

After the plating of the magnetic film, the substrate and its multiple layers is rinsed and immersed in a copper plating bath, such as that disclosed in commonly assigned copending application IBM Docket YO967-141, and a thick copper film is deposited according to the method disclosed therein. A preferred bath disclosed in the aforesaid application consists of water to make 1000 cc., $H_2SO_4$ in the amount of 0.27 mole, formic acid in the amount of 0.42 mole, acetic acid in the amount of 0.16 mole, $Cu(NO_3)_2 \cdot 3H_2O$ in the amount of 0.207 and about 0.5 gram of Triton X 100 a surfactant.

A thick copper film is deposited onto the surface of the first magnetic film by flowing the above bath over the substrate at a uniform velocity with laminar agitation. The current density is maintained at about 40 to 50 ma./cm$^2$. Plating is continued at room temperature for a time sufficient to obtain a copper deposit of about 3 to 12 microns. The plating rate is about 8000 A./min.

A second smoothing copper is then plated from the bath and method disclosed above. The transfer of the substrate to the bath of this invention need not be preceded by a rinse step since the thick copper plating bath is compatible with that of the present invention.

Finally, a second magnetic film of about 900 A. is deposited as described above. The plated coupled film device is then subjected to an annealing temperature of about 200° C. for 30 minutes in the presence of an orienting magnetic field and then allowed to cool.

Etching of the plated coupled film device is next accomplished by standard techniques to provide control lines therein. The edges of the etched device is then plated with magnetic material for efficient flux closure. A method for edge plating the device is disclosed in commonly assigned copending application Docket YO967-143 to G. S. Alberts and J. M. Brownlow entitled "A Method of Edge Plating Coupled Film Devices."

Coupled magnetic devices prepared according to the above methods and from the above copper plating bath exhibited uniform magnetic properties. There is no indication of stress build-up in the permalloy film. The magnetic films have $H_0$ values of 4 or greater and $\alpha$ values of 1 or less.

EXAMPLE 2

In another preferred embodiment of the invention, a bath having the following compositions is prepared:

Water to make 1000.0 cc.
$CuSO_4 \cdot 5H_2O$—0.12 mole
$HNO_3$—0.40 mole
1% gelatin solution—0.15 gm.
Tartaric acid—0.20 mole
Triton X 100—0.5 gm.

A device was made according to the method described above in Example I. Smoothing copper films were deposited from the above bath. The plated films were found to possess excellent surface texture and grain sizes of about 100 A. No stress is apparent in the magnetic films which exhibited excellent magnetic properties, for example, $H_0$ values of 4 or greater and $\alpha$ values of 1 or less.

For the purpose of comparison, smoothing copper plating baths are prepared in which the constituents are present in amounts that are outside the upper and lower limits of the ranges required in the present invention. The following baths, disclosed in Examples 3 and 4 are exemplary of baths falling outside upper and lower limits of the desired range.

EXAMPLE 3

Water—1 liter.
$H_2SO_4$—.450 mole, 12.5 cc.
$Cu(NO_3)_2 \cdot 3H_2O$—.016 mole, 4 gms.
$CuSO_4 \cdot 5H_2O$—.100 mole, 25 gms.
Gelatin solution—0.15 gm.
Tartaric acid—.020 mole 3.0 gms.
Triton X100—0.6 gm.

EXAMPLE 4

Water—1 liter.
$HNO_3$—0.240 mole, 15 cc.
$Cu(NO_3)_2 \cdot 3H_2O$—0.100 mole, 25 gms.
$CuSO_4 \cdot 5H_2O$—0.016 mole, 4 gms.
Gelatin solution—0.15 gm.
Tartaric acid—0.020 mole, 3.0 gms.
Triton X100—0.6 gm.

Smoothing copper films were deposited from the baths shown in Examples 3 and 4 in the same manner as in Example 1. The plated films exhibited poor surface textures. The smoothing copper films also failed to withstand the heat cycling at 200° C. These films exhibited distortion, that is, large internal stress, and as a consequence induced stress in the magnetic film. The magnetic properties of the plated magnetic films changed drastically and were not reproducible. For example, the properties of the magnetic films had properties outside the range sought, e.g., that had coercivities of from 8 to 10 and dispersions of from 6 to 12.

It should be understood that the practice of the invention is not limited to the electro-deposition of copper for the particular application described above, but is also generally applicable to any electrolytic process in which it is desired to produce smoothing copper films having high quality surface textures of uniform thickness, low internal stress and which will not blister or distort upon heating.

There has been described an improved method for preparing coupled film devices as well as a smoothing copper plating bath having the following constituents in the indicated critical limits: sulfate ions in the range of 0.060 to 0.37 mole/liter; nitrate ions in the range of from 0.032 to 0.400 mole liter; cupric ions in the range of from 0.062 to 0.132 mole/liter; gelatin in the range of from 0.10 to 0.50 gm./liter; tartaric acid in the range of from 0.007 to 0.040 mole/liter. An additional requirement is that the sulfate ion to nitrate ion be present in a molar ratio of from 0.30 to 10.0.

While the invention has been particularly shown and described with references to preferred embodiments thereof, it will be understood by those skilled in the art that the foregoing and other changes in form and details may be made therein without departing from the spirit and scope of the invention.

What is claimed is:

1. An improved method of preparing coupled-film devices comprising the steps of:

(a) establishing as a substrate an insulated ground plane, (b) stepwise depositing a conductive copper film onto said insulator, (c) electrodepositing a first smoothing copper film into the copper plated substrate from a smoothing copper bath consisting essentially of;

water to make 1 liter, a water soluble copper salt selected from $CuSO_4$ and $Cu(NO_3)_2$ to supply cupric ions, a source selected from $H_2SO_4$ and $CuSO_4$ to supply sulfate ions, a source selected from $Cu(NO_3)_2$ and $HNO_3$ to supply nitrate ions, said sulfate and nitrate ions being present in a molar ratio in the range of about 0.30 to about 10.0, gelatin and tartaric acid, (d) electrodepositing a first magnetic film into said smoothing copper film, (e) electrodepositing a thick copper film onto said first magnetic film, (f) electrodeposting a second smoothing copper film onto said thick copper film as in step c, and finally (g) electrodepositing a second magnetic film onto said second smoothing copper film.

2. A method according to claim 1 wherein said conductive copper film is partially deposited at a temperature of about 125° C. and partially at a temperature below 50° C.

3. A method according to claim 2 wherein 150 A. of said conductive copper film is deposited at 125° C. and 450 A. of said copper film is deposited at below 50° C.

4. A method according to claim 1 wherein said smoothing copper bath consists of water to make 1 liter, cupric ions are present in the range of from about 0.062 to about 0.132 mole/liter, said sulfate ions are present in the range of from about 0.060 to about 0.37 mole/liter, said nitrate ions are present in the range of from about 0.032 to about 0.40 mole/liter, said gelatin is present in the range of from about 0.10 to about 0.50 gm./liter and said tartaric acid is present in the range of from about 0.007 to about 0.04 mole/liter.

References Cited

IBM Technical Disclosure Bulletin, J. M. Brownlow, vol. 9, No. 9, February 1967, p. 1067.

IBM Technical Disclosure Bulletin, Koretsky et al., vol. 9, No. 7, December 1966, p. 750.

J. Amer. Electrochem. Soc., Bennett, vol. XXIII, 1913, pp. 245, 248.

JOHN H. MACK, Primary Examiner

R. L. ANDREWS, Assistant Examiner

U.S. Cl. X.R.

29—199, 571